UNITED STATES PATENT OFFICE.

CYRUS BENEDICT, JR., OF OMRO, WISCONSIN.

IMPROVED COUGH-SIRUP.

Specification forming part of Letters Patent No. 54,098, dated April 24, 1866.

*To all whom it may concern:*

Be it known that I, CYRUS BENEDICT, Jr., of Omro, in the county of Winnebago, in the State of Wisconsin, have invented or discovered a new and valuable Cough-Sirup; and I do hereby declare the following to be a full and exact description thereof.

The nature of my invention or discovery consists in compounding, medicating, and manufacturing certain roots, herbs, vegetable gums, and liquors into a cough-sirup.

To enable others skilled in the arts to make and use my invention or discovery, I will proceed to describe its preparation.

To make one gallon of my cough-sirup, I take three-ounces, root and all, of an herb I call "none-such," two ounces of licorice-root. I put them into a kettle with two gallons of soft water, put it over the fire, let it boil until the strength is out, then take it off from the fire, strain it, put it over the fire again, and then I add five pounds of crushed sugar, one pound of strained honey, one-half pint of gin, one teaspoonful of a solution composed of two ounces camphor gum, one-half ounce of gum-myrrh, one table-spoonful of cayenne pepper. I let it raise the boil, skim it thoroughly, and when all the within-mentioned articles are boiled down to one gallon I set it off from the fire, let it stand until it is perfectly cold and well settled. I then bottle it up and it is ready for use.

I use alcohol to cut camphor gum. I put gum-myrrh into cold water, put it where it will get nearly boiling hot to dissolve it. When gum-myrrh is dissolved I put it and cayenne pepper in a bottle with the alcohol and gum-camphor. I mix them well together by shaking. I then have a solution such as is referred to within, and that I name the "Wonder of the Age."

What I claim as my invention or discovery, and desire to secure by Letters Patent, is—

The compounding and medicating the herein-described articles into a cough-sirup.

CYRUS BENEDICT, JR.

Witnesses:
   N. FRANK,
   Z. K. FELTON.